US006275506B1

(12) United States Patent
Fazel et al.

(10) Patent No.: US 6,275,506 B1
(45) Date of Patent: Aug. 14, 2001

(54) RADIO TRANSMISSION METHOD FOR DIGITAL MULTIMEDIA DATA SIGNALS BETWEEN SUBSCRIBER STATIONS IN A LOCAL NETWORK

(75) Inventors: Khaled Fazel, Wessling; Otto Klank, Lehrte-Arpke; Patrick Robertson, Ammerland, all of (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/003,741

(22) Filed: Jan. 7, 1998

(30) Foreign Application Priority Data

Jan. 8, 1997 (DE) .............................................. 197 00 303

(51) Int. Cl.$^7$ ....................................................... H04J 4/00
(52) U.S. Cl. ........................... 370/478; 370/459; 455/455; 455/516
(58) Field of Search ..................................... 370/345, 347, 370/348, 349, 350, 436, 492, 458, 459, 468, 478, 330, 445; 455/455, 516, 67.1, 422, 423

(56) References Cited

U.S. PATENT DOCUMENTS

| 4,736,371 | * | 4/1988 | Tejima et al. ......................... | 370/236 |
| 5,134,615 | * | 7/1992 | Freeburg et al. ...................... | 370/347 |
| 5,283,811 | * | 2/1994 | Chennakeshu et al. .............. | 375/233 |
| 5,652,751 | * | 7/1997 | Sharony ................................ | 370/227 |
| 5,742,593 | * | 4/1998 | Sharony et al. ...................... | 370/330 |
| 6,198,909 | * | 3/2001 | Du ....................................... | 455/67.1 |

FOREIGN PATENT DOCUMENTS

| 3511430 | 10/1986 | (DE) . |
| 3527331 | 2/1987 | (DE) . |
| 9214885 | 4/1994 | (DE) . |

* cited by examiner

Primary Examiner—Huy D. Vu
Assistant Examiner—Kevin C. Harper
(74) Attorney, Agent, or Firm—Joseph S. Tripoli; Joseph J. Laks; Ronald H. Kurdyla (57) ABSTRACT

In the radio transmission method according to the invention, which operates with a mixed frequency and time division multiplex method FDMA/TDMA, in which a relatively broad frequency band is divided according to the FDMA method into a plurality of carrier frequency ranges, namely the so-called main channels, and a plurality of time slots, namely the so-called sub-channels, distributed in a frame structure, are formed on each carrier frequency level according to the TDMA method, a grouping, that is to say a so-called cluster, of subscriber stations is assigned a limited number of main channels. A main channel signal is divided into one or more sub-channel signals which are associated with a cluster and which are transmitted using the TDMA method. Each transmitter of an activated subscriber station transmits a detectable check signal, so that, on the basis of detection of a check signal in the respective receiver, other, newly activated subscriber stations can determine the presence of transmit signals which are present within a specific, spatially limited range, namely their own respective transmission range. The method according to the invention can be used for transmitting information between terminals in indoor networks in a wireless manner without a central station.

66 Claims, 8 Drawing Sheets

RADIO TRANSMISSION METHOD FOR DIGITAL MULTIMEDIA DATA SIGNALS BETWEEN SUBSCRIBER STATIONS IN A LOCAL NETWORK

The invention relates to a radio transmission method in accordance with the preamble of Patent claim 1.

The transmission of information between the strongly increasing number of multimedia terminals, for example television sets (portable or fixed TV sets), video recorders, computers (fixed personal computers or portable laptops), personal digital assistants (PDA), cordless telephones, alarm systems etc., in a local network (LAN, Local Area Network), for example in an indoor network, and the execution and organization of said transmission result in novel local networks.

Furthermore, in order to avoid network cabling it is desirable for these local networks to operate in a wireless manner via radio frequency (RF) radio connections. Furthermore, each of these terminals also receive from outside different types of signals which in turn originate from various networks. As a result, a local network has to cope with a very wide variety of data rates. Thus, for example in the case of digital television (DVB, Digital Video Broadcasting) the data rate per program can translate up to 6 Mbit/s or, in the case of high-resolution television HDTV (High Definition Television) even up to 24 Mbit/s. In contrast, the data rate of the ISDN service which operates via a telephone line is only 128 kbit/s. For a data transfer between two computers, 2 Mbit/s are required, for example.

An example of digital services with various data rates within a building or within a flat, that is to say a grouping (so-called cluster) of a wide variety of subscriber stations is given in Table 1. The overall data rate to be coped with, which is made up of the various data rates of a plurality of digital services with different data rates, is also given in the following Table 1.

TABLE 1

| Digital service | Mbit/s |
|---|---|
| 2 Digital television stations | 6 + 6 |
| 1 Digital video recorder | 6 |
| 2 × data transfer | 2 + 2 |
| 2 × DAB channels | 1.5 + 1.5 |
| ISDN | 0.128 |
| Overall data rate of the services | 25.128 |

The overall data rate within a cluster can therefore be approximately 25 Mbit/s. A future local indoor radio network system should therefore be capable of transmitting such high data rates within a cluster.

The RF connection can comprise, for example, the so-called ISM (Industrial Scientific and Medical) bands which lie at frequencies in the 2.4/5.8 GHz ranges. The ISM bands with a carrier frequency of 2.4 to 2.4835 GHz (or 5.725 to 5.875 GHz) have a bandwidth of 83.5 MHz (or 150 MHz). Their main advantage is to be seen in the fact that an adequate indoor coverage range with low outlay on RF components of the transmitters/receivers can be obtained. Also, any type of modulation technology and any desired multiple access schemes may be applied in the ISM bands. There are also no specific recommendations or regulations with respect to the channel spacing to be maintained. The transmit antenna may be of integrated design; however, if reception is to be at a fixed location, the directional antenna may also be used for transmission.

However, the ISM bands used for indoor communication suffer, like other similar frequencies, from multipath propagation (owing to refraction, scatter and diffraction), from Doppler shifts and from interference. The lower range of the first band at 2.4 GHz is also used for amateur radio purposes, which can cause strong interference in a local indoor network. Furthermore, microwave ovens can also cause additional interference in the transmission channel.

The propagation time period of indoor channels in medium-sized rooms is between 20 and 65 ns. Owing to movement in the surroundings, Doppler shifts occur which are of different sizes at the various radio frequencies (for example approximately 10 to 17 Hz at 2.4 GHz and approximately 20 to 35 Hz at 5.8 GHz). Apart from multi-path propagation and fading, strong interference may also occur in the frequency bands under consideration. This interference mainly originates—as already mentioned—from amateur radio up to approximately 50 dBm transmitting power and from microwave equipment (microwave ovens). In addition, co-channel interference (CCI) originating from adjacent networks operating in the same frequency band can also reduce the efficiency of the system.

In order to overcome the aforesaid channel interference, broadband systems with band spread spectrum technology and rake receivers or else narrowband systems with equalizers can be used in local networks, for example indoor networks. A broadband system with spread spectrum technology requires a very large bandwidth. Each information symbol is spread with a PN (pseudonoise) code. The spread spectrum can be based, in a known manner, either on the direct sequence method (DS-SS, Direct Sequence-Spread Spectrum) or on the frequency hopping method (FH-SS, Frequency Hopping-Spread Spectrum).

In the case of the direct sequence method, the receiver must break up all the received signal paths by means of a rake receiver. The multiple access can be carried out by using various spread codes, each assigned to a subscriber in the network. In the known US Standard IEEE.802.11 a spread spectrum with DS-SS or FH-SS is used.

In the case of DS-SS, the available ISM bandwidth is initially divided up into equidistant channels of 10 MHz bandwidth. Each information bit is spread by means of a PN code with a spread factor of 10. For the modulation, the differential BPSK (Binary Phase Shift Keying) modulation or the differential QPSK (Quadrature Phase Shift Keying) modulation is used.

However, in the case of FH-SS, 79 frequencies with a bandwidth of 1 MHz each are used. The minimum frequency hopping rate (frequency change) is 2.5 hops/s. In total, there are 22 PN codes for changing. The modulation is based on 2- or 4-state GFSK (Gaussian Frequency Shift Keying). The maximum data rate is only 2 Mbit/s for both systems. Neither DS-SS nor FH-SS systems use channel coding in the physical layer of the U.S. Standard IEEE.802.11.

The second known possible way of combating interference in an indoor channel is to use narrowband channels with optional equalization. The bandwidth of each channel has to be kept proportional here to the data rate to be transmitted. The multiple access can be based on FDMA (Frequency Division Multiple Access, frequency-division multiplexing), TDMA (Time Division Multiple Access, time division multiplexing) or a combination of TDMA and FDMA.

Such a concept is used in the so-called DECT (Digital European Cordless Telecommunication) Standard and also in the Hiperlan Standard (ETS 300 652). The DECT system uses carrier frequencies of 1.88 to 1.9 GHz with a channel spacing of 1.728 MHz employing TDMA multiplex technology. A combination of FDMA/TDMA is used as multiple access method, the time division multiplex system being used between the cordless receiver and the base station. Only the CRC code is used for channel coding. The audio channel with ADPCM (Adaptive Differential Pulse Code Modulation) compression has a data rate of 32 kbit/s (voice coding). The modulation is based on the so-called GFSK modulation method, which produces an overall data rate of 1.152 Mbit/s. As a result of the transmission with a low data rate, equalization is optional for the DECT system.

In the case of the Hiperlan system, carrier frequencies of 5.15 to 5.29 GHz are used. The available bandwidth is divided into five bands of approximately 23.5 MHz. In this system, transmission is provided at a high data rate (23.5 Mbit/s) and at an centre data rate (1.47 Mbit/s). The multiple access is based on the TDMA method. For transmission at a high data rate GMSK (Gaussian Minimum Shift Keying) is used as the modulation method and for transmission at the centre data rate FSK (Frequency Shift Keying) is used as the modulation method. For channel encoding, the BCH(31,26, 3) code with time multiplexing is used, which makes it possible to correct an individual bit (or to detect two bit errors. Because of the high data rate, an equalizer is used in this system to minimize the effects of intersymbol interference (ISI).

With the exception of the DECT Standard, the existing standards are basically provided for data transmission. Since the propagation time is not a critical criterion during data transmission, the ARQ (Automatic Request) protocol is usually used to achieve reliable transmission. For this reason, only one error detection or a very simple error detection code is customarily used for these standards.

The concept which is applied in the U.S. Standard IEEE.802.11 already mentioned does not permit a higher data rate than 2 Mbit/s per channel. If, for example, all the available channels are used, the overall data rate does not exceed 14 Mbit/s. Furthermore, it is difficult with this concept to achieve a variable data rate. If the interference power originating from amateur radio equipment or microwave ovens is very high, one or more channels of 10 MHz bandwidth (in the case of DS-SS systems) cannot be used for the data transmission, which leads to a severe reduction in the resources available.

The DECT system which is basically configured for the telephone service permits neither high data rates nor variable data rates to be transmitted. The maximum data rate per 1.728 MHz channel is limited to 1.152 Mbit/s, which conflicts with an application in the indoor transmission systems under consideration here. Furthermore, the network topology used in the DECT system is a central topology, i.e. a base station is required to coordinate all the active subscribers within the network. The communication between two subscribers within the network takes place via a base station, giving rise to a very low spectral efficiency (low overall data rates of all the active subscriber stations) when used in an indoor transmission system under consideration here. The presence of a base station is also unfavourable for economic reasons.

In addition, the aimed-for bit error rate in the DECT system is considerably higher than is necessary in the case of a video transmission. The high degree of flexibility provided with the DECT system can be controlled only with great difficulty in the case of services with a high data rate. A voice channel requires only 32 kbit/s. Overall, 120 frequency slots and time slots which are available for voice channels are produced. For this reason, the probability that all the frequencies are being used in the neighbouring buildings or flats is very low.

Thus, it is not necessary to have any previously assigned frequency slots or time slots. However, it is difficult to adopt this strategy for applications which high data rates (more than 25 Mbit/s), as in the case of the indoor systems under consideration here, since the number of such channels in the ISM bandwidth or in similar bands will be much lower.

The Hiperlan system permits transmission with a high data rate, but not with a data rate which is lower than 1.47 Mbit/s, which, for the case of ISDN transmissions, means, for example, that ISDN signals cannot be transmitted efficiently, since in this case there is a much lower transmission data rate, namely of 128 kbit/s. The low channel-coding error-correction capacity used in the Hiperlan system is not appropriate for a video transmission.

Furthermore, in the case of high-power interference, it is necessary to separate off one or more channels with a bandwidth of 23.5 MHz each, which drastically reduces the spectral efficiency of the overall system. The Hiperlan system requires time multiplexing, which in itself has the advantage that the error statistics at the input of the channel decoder are decorrelated. However, the disadvantage of any multiplexing is its additional propagation time, which is unsuitable for interactive services such as video telephone services, telephone services etc.

The invention is based on the object of providing a radio transmission method for broadband digital multimedia data services, for example digital television, voice, data, between subscriber stations in a local network, in particular in an indoor radio network, employing a completely decentralized, distributed system topology, in which each subscriber station can communicate directly with any other subscriber station in the network, the large range of different transmission data rates (from a few kbit/s up to several Mbit/s) of the various services being covered completely and a suitable multiple access method with robust channel coding, modulation and synchronization device being selected. The quality requirements (bit error rate less than $10^{-10}$ in the case of a video transmission and less than $10^{-3}$ for voice as well as low propagation time of approximately 10 ms) which are made of the various services, will also be fully retained for transmission in the local network. In this context, it will be possible to use low-cost transmitters/receivers with a low level of complexity. Furthermore, a high level of flexibility with respect to frequency planning and radio resource management is to be possible.

According to the invention, this object is achieved with a radio transmission method of the generic type by means of the features specified in the characterizing part of Patent claim 1.

Expedient developments of the radio transmission method according to the invention are specified in the subclaims.

The radio transmission method according to the invention is explained below in detail.

Figure 1:
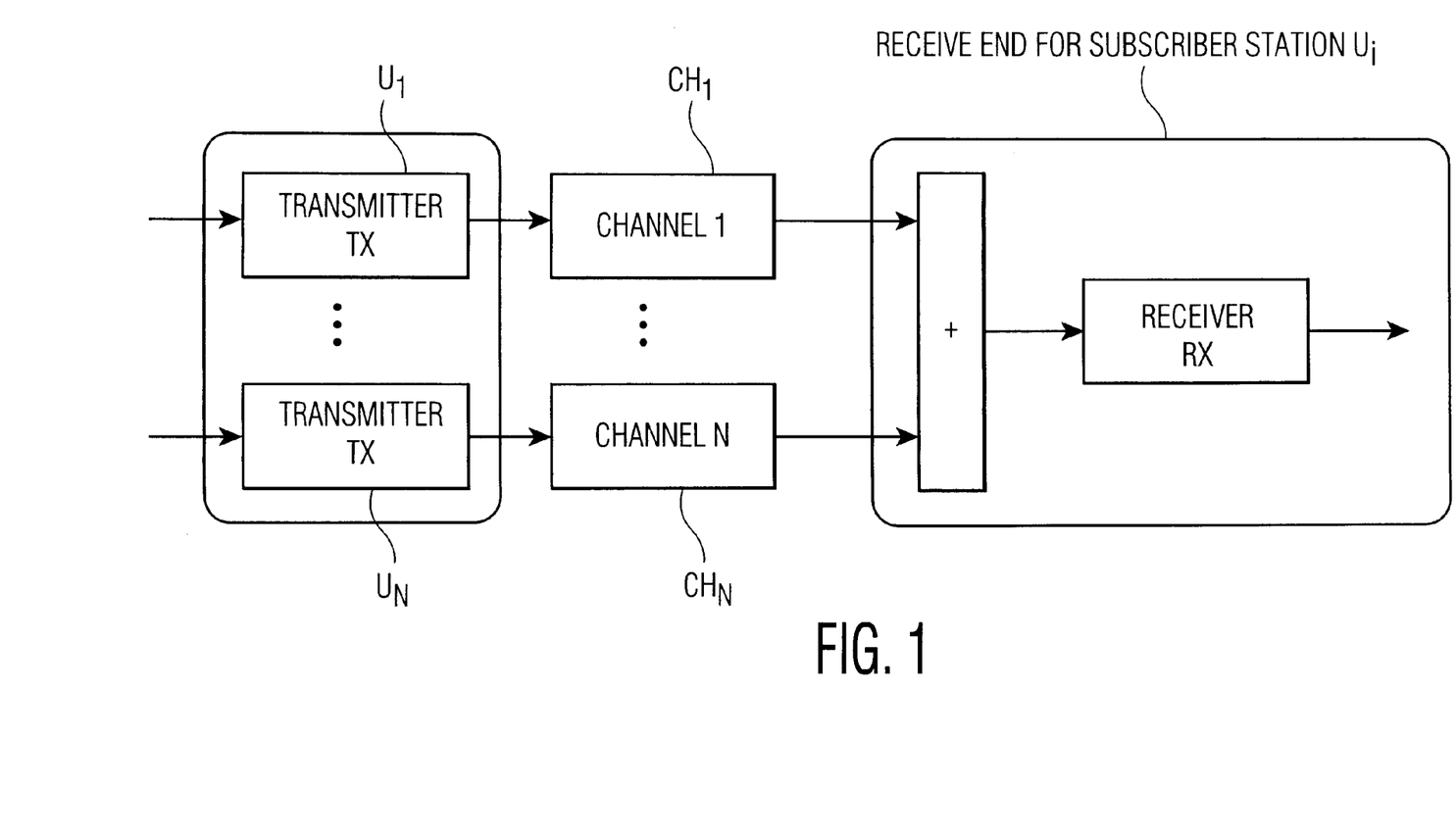
FIG. 1 shows a block circuit diagram of a general concept for a system for executing the radio transmission method according to the invention.

A general concept for a system for executing the radio transmission method according to the invention is illustrated in FIG. 1. The essential factor is that each subscriber station communicates with other subscriber stations independently, i.e. without the intermediate connection of a base station. The subscriber station $U_i$ receives with its receiver RX all the signals broadcast by the transmitters TX of the subscriber stations $U_1 \ldots U_N$ and transmitted via the transmission channels $CH_1 \ldots CH_N$, each subscriber station extracting its own information from the received signals.

Figure 2:
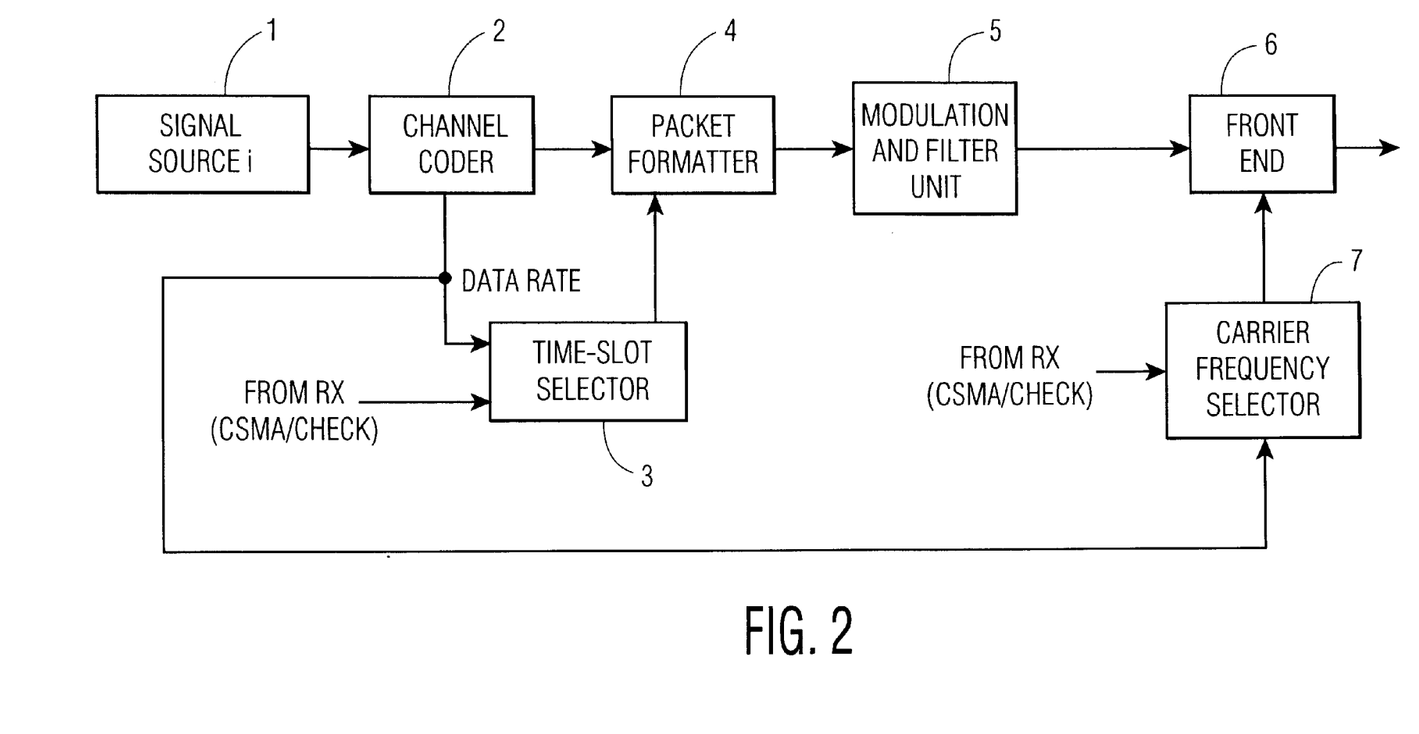
FIG. 2 shows the block circuit diagram of a transmitter in the system according to FIG. 1.

The block circuit diagram of the transmitter TX of the subscriber station $U_i$ in the system according to FIG. 1 is illustrated in FIG. 2. The transmitter has a signal source 1, a channel coder 2, a multiplex device comprising a time-slot selector 3 and a packet formatter 4, a modulation and filter device 5 and a front end 6, by which the transmit signals are broadcast into the free space via an antenna. The time-slot selector 3 and a carrier frequency selector 7 controlling the front end 6 are controlled by the associated receiver RX, which will be described later in detail.

Figure 3:
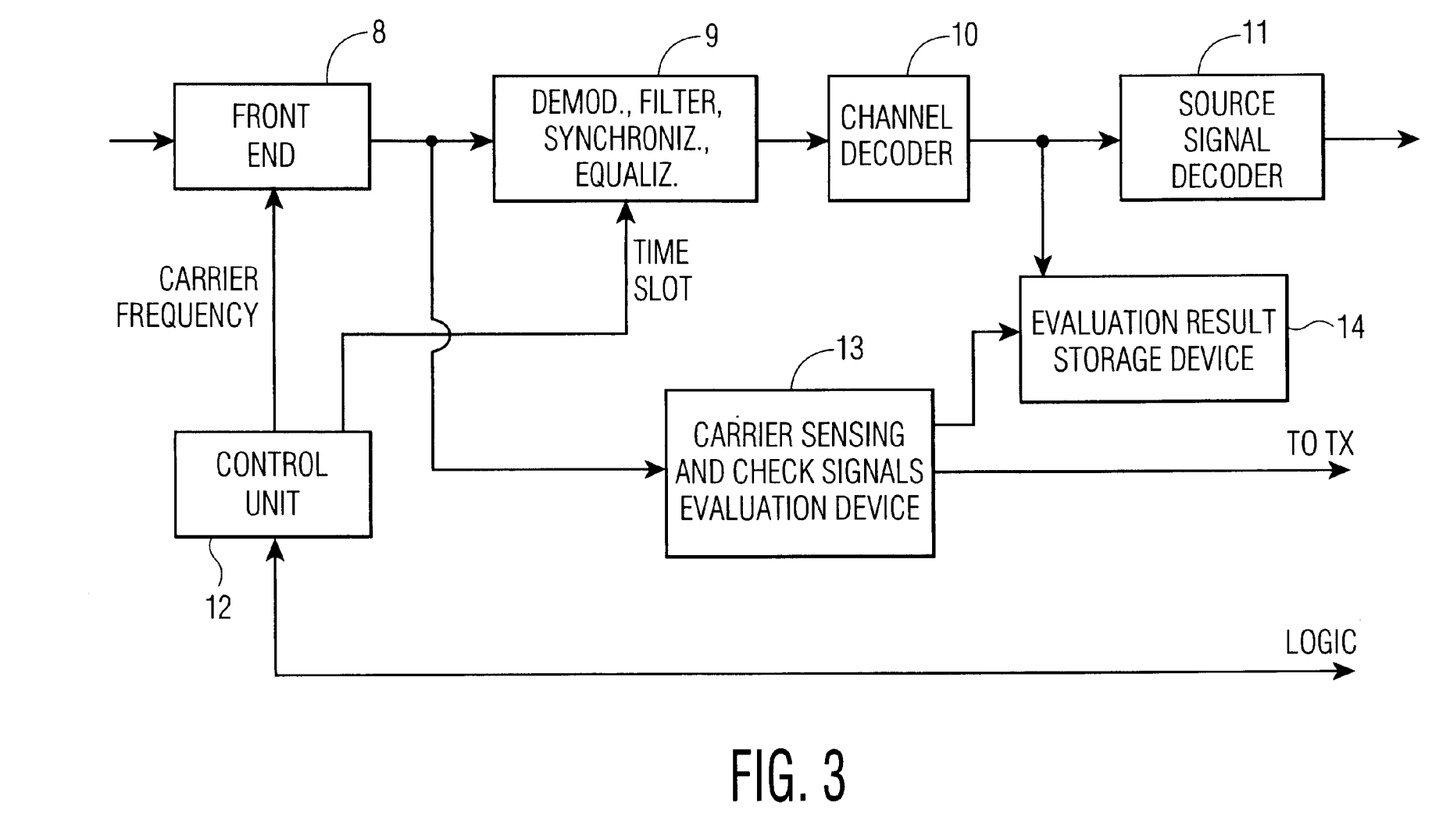
FIG. 3 shows the block circuit diagram of a receiver in the system according to FIG. 1.

The block circuit diagram of the receiver RX of the subscriber station $U_i$ in the system according to FIG. 1 is illustrated in FIG. 3. Basically, the inverse operations with respect to those of the transmitter TX according to FIG. 2 are executed there. The signals which are received via an antenna pass via a front end 8, a demodulation, filter, synchronization and equalization device 9 and a channel decoder 10 to a source signal decoder 11. A control unit 12 controls the front end 8 with respect to the carrier frequency and the device 9 with respect to the time slot. The signals for controlling the associated transmitter (illustrated in FIG. 2) are derived from the receiver via devices 13 and 14, which will be described later in detail with respect to the functions.

In the radio transmission method according to the invention, a combination of FDMA with TDMA is used. The entire bandwidth available is divided up into a plurality of equidistant bands in accordance with an FDMA setting. Each cluster is permitted to use only one or two of these bands. Thus, the clusters are separated only by different frequencies. Then, the TDMA technology is finally used on each of these bands in order to divide up the spectrum between different subscriber stations.

The access to the network is random. However, each of the subscriber stations has its specific address within the FDMA frame comprising a plurality of time slots. Depending on the data rate, each subscriber station is assigned one or more time slots. It is thus easily possible to transmit with a variable data rate.

The free time slots of the various frequencies are detected on the basis of the information relating to the carrier sensing (will be explained later) and the control signal in the device 13 (FIG. 3).

A transmitter illustrated in FIG. 2 will be explained in more detail below. To protect the broadcast data against channel influences, redundancy is added to the broadcast information with the aid of the channel coder 2. The selection of the channel coding depends on the bit error rate which is ensured for a given service and a transmit power. Furthermore, the complexity of the channel decoding to be executed at the receive end is also a decisive parameter for this selection.

The communications in the local network relate to various services, for example audio/voice, data and video. The required bit data rates for these services are quite different. For example, the bit error rate (BER) for voice services is approximately $BER \leq 10^{-3}$. The bit error rate for data transmission is in the order of magnitude of $BER \leq 10^{-6}$. In contrast, the bit error rate for video transmission requires a very low bit error rate $BER \leq 10^{-10}$. Furthermore, in order to maximize compatibility with the DVB Standard for channel coding, it would be advisable to use a simple, but effective Reed-Solomon code RS(204, 188, 17). Reed-Solomon codes are very effective in correcting error bursts. Furthermore, the changing in indoor channel states is very slow, for which reason time division multiplexing is not very effective.

In addition, in the exemplary embodiment illustrated, time division multiplexing is not considered any more owing to the propagation time requirement (not more than 10 ms). For applications which are insensitive to propagation times, for example data transfer, there may, however, be the option of time division multiplexing. From a later part of the description in conjunction with the frame structure it also becomes clear that, in the case of QPSK modulation (or 16 QAM), a Reed-Solomon codeword corresponds precisely to one time slot (or a quarter (¼) of a time slot). This fact ensures compatibility with the MPEG (Moving Picture Experg Group) transport packet format for digital video signals.

In an indoor environment, it is necessary to allow for the fact that adjacent buildings/flats or clusters participate in the same overall spectrum. For this reason, interference between such adjacent units has to be taken into account or attempts must be made to avoid it. Furthermore, the ISM bands or comparable bands suffer, as has already been explained, from the presence of high-performance narrow-band interference which is brought about by amateur radio services. In order to counteract these difficulties, in the radio transmission method according to the invention an combination of FDMA with TDMA is used. According to an FDMA setting, the overall bandwidth is divided up into a plurality of equidistant bandwidths of 10.4375 MHz. Only a single bandwidth (or two of these bandwidths) may be used in each cluster. Thus, the clusters are separated by different frequencies. Finally, the TDMA multiple access technology is applied to each of these bands, but only within a cluster.

With a very simple TDMA/FDMA scheme it is possible to assign a different carrier band and re-use frequencies to each building/flat. For example, eight different frequency bands may be sufficient to achieve sufficient separation.

Figure 4:
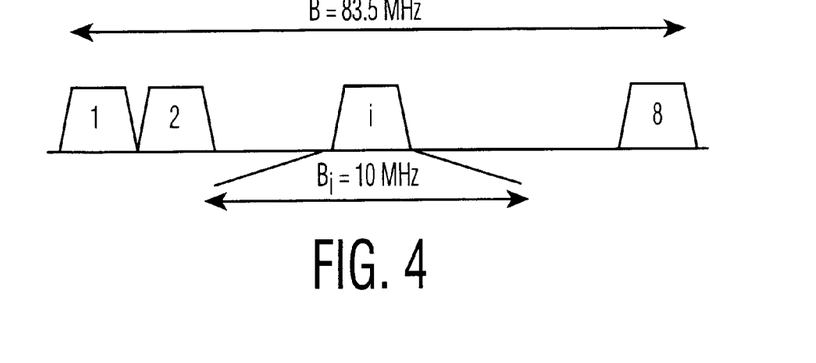
FIG. 4 shows a diagram of the dividing up of a frequency band in the case of FDMA multiple access.

The FDMA technology permits there to be a large number of clusters within the overall ISM transmission bandwidth. The overall 83.5 MHz bandwidth in the case of the 2.4 GHz ISM band (or 146.125 MHz bandwidth in the case of the 5.8 GHz ISM band from 150 MHz) is divided into 8 (or 14) bands. This splitting up of the band is represented in a diagram for the case of a 2.4 GHz ISM band in FIG. 4. Each cluster is assigned to one of these bands (however in the case of 150 MHz one cluster can use two bands). Each band is separated by a guard band of 0.4375 MHz, 10 MHz being used for data transmission within a cluster.

Time multiplexing (TDMA) is used as multiple access technology within each cluster and band. It permits a large number of subscriber stations to operate within a cluster, each subscriber station being able to use the medium for a period of time. Relatively long messages are organized into packets which are transmitted in specific time slots. The basic precondition consists in the fact that each subscriber station can communicate with every other subscriber station within a cluster without using a base station.

There may be a point-to-point or a point-to-multipoint (radio) communication, it also being possible to use the ARQ protocol in the former case (optional). Each packet is located in a time slot here. The time slot positions are known to the receiver and to the transmitter. The time slot clock can be controlled by each of the active subscriber stations, specifically as a function of which subscriber station has firstly begun to transmit on the clear channel, i.e. the time slot structure is determined by the first subscriber station using the channel and is followed by any other subscriber station which would like to join in.

Figure 6:
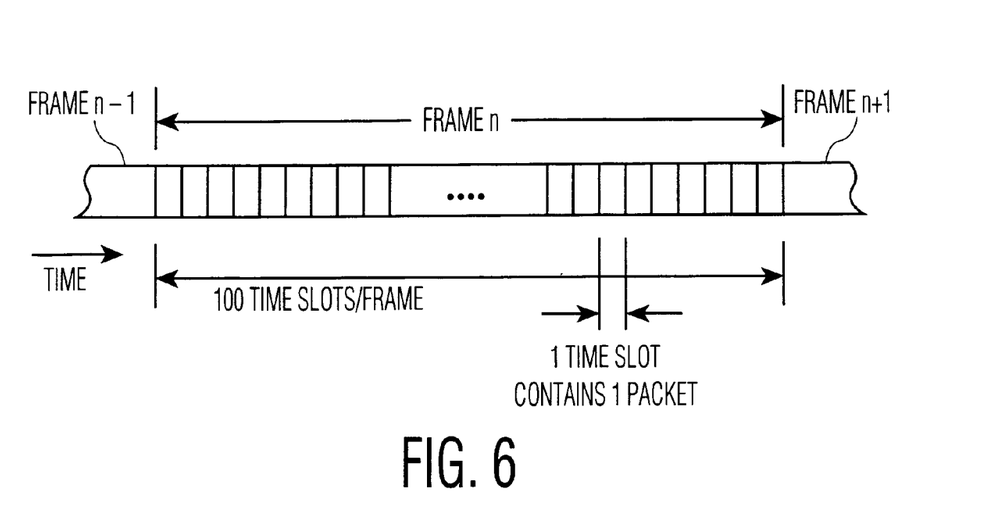
FIG. 6 shows a diagram of a possible way of implementing a frame with, for example, 100 TDMA time slots.

FIG. 6 is a diagram of a possible way of embodying a frame with, for example, 100 TDMA time slots. The frame structure is also specified by the first subscriber station. Each packet occupies a time slot. For example, 860 modulated symbols may be combined per packet.

Figure 5:
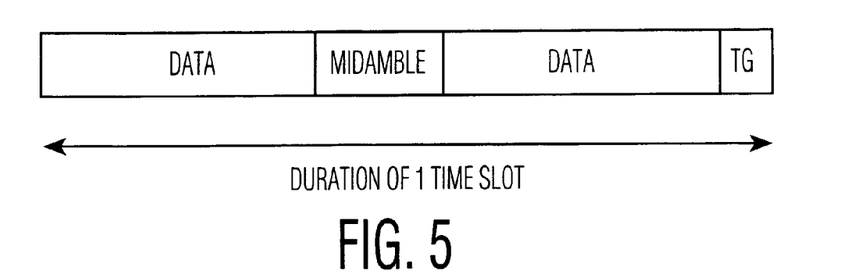
FIG. 5 shows a diagram of the organization in a TDMA time slot.

As is shown by FIG. 5 in an organization diagram, each transmitted time slot contains, between two data components, a midamble which is used for assessing channels, equalization and synchronization. The time slot ends with the so-called guard time Tg, which does not contain any information at all.

Figure 7:
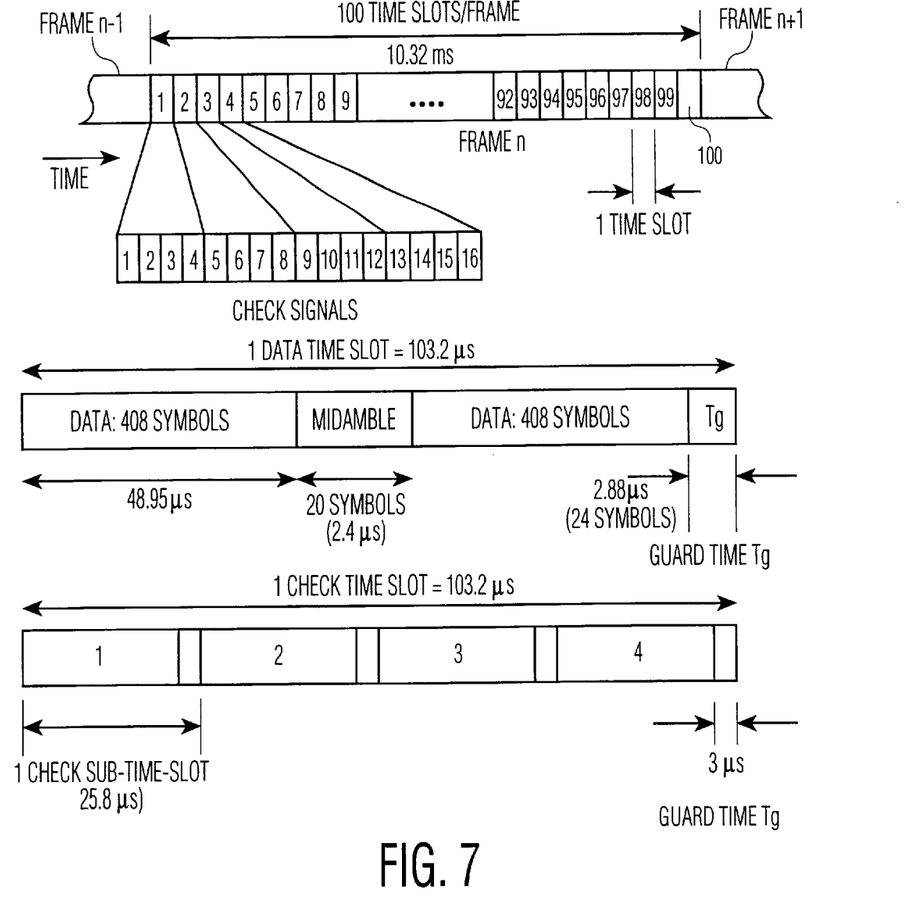
FIG. 7 shows the structure of a frame in detail.

FIG. 7 illustrates the structure of an exemplary frame in detail. Each TDMA frame has a duration of 10.32 ms and comprises 100 time slots, each with a duration of 103.2 $\mu s$. The first four time slots contain check signals. Each check time slot comprises 4 check signals which permits a maximum of 16 check signals. Each check signal corresponds to an active subscriber station within a cluster (active means receiving or transmitting or both; this depends on whether the application is radio or point-to-point operation). Overall, 16 active subscriber stations may therefore communicate within a cluster.

Each time slot comprises three different components, namely the data, the midamble and the information-free guard time Tg. All 816 data symbols (or a packet) are divided into 2×408 (respective duration 48.96 $\mu s$) symbols and transmitted both before and after the midamble within a time slot. The midamble comprises 20 symbols with a duration of 2.4 $\mu s$. Each time slot is concluded with a guard time Tg with a duration of 2.88 $\mu s$ (or 24 symbols). The duration of the guard time Tg depends on the maximum echo length and both on the switch on/off time of the oscillator and on the clock accuracy levels.

Up to eight different sequences may be selected as midamble, in each case one of the so-called training sequences being respectively assigned to one frequency. Each training sequence comprises 20 symbols. Of these 20 symbols, only the 16 center ones are used for channel estimation. The remaining 4 symbols (two at the beginning, two at the end) are used for echo resolution. These 16 symbols have very good cross-correlation and auto-correlation properties. The various training sequences used as midamble are illustrated below in Table 2.

TABLE 2

Training sequences

| | | | | | | | | | | | | | | | | | | | | |
|---|---|---|---|---|---|---|---|---|---|---|---|---|---|---|---|---|---|---|---|---|
| 1 | +1 | +1 | −1 | +1 | −1 | −1 | −1 | +1 | +1 | +1 | +1 | −1 | +1 | +1 | +1 | −1 | +1 | +1 | −1 | +1 |
| 2 | +1 | −1 | −1 | +1 | −1 | −1 | −1 | +1 | −1 | −1 | −1 | −1 | +1 | +1 | +1 | −1 | +1 | −1 | −1 | +1 |
| 3 | +1 | +1 | +1 | −1 | −1 | −1 | +1 | −1 | −1 | −1 | +1 | −1 | +1 | +1 | −1 | +1 | +1 | +1 | +1 | −1 |
| 4 | +1 | +1 | −1 | −1 | −1 | −1 | +1 | −1 | +1 | −1 | −1 | +1 | −1 | +1 | +1 | +1 | +1 | −1 | −1 | −1 |
| 5 | −1 | −1 | +1 | −1 | +1 | −1 | −1 | −1 | +1 | +1 | −1 | +1 | +1 | +1 | +1 | +1 | −1 | −1 | +1 | −1 |
| 6 | +1 | −1 | −1 | −1 | +1 | −1 | +1 | −1 | −1 | +1 | +1 | +1 | +1 | +1 | −1 | +1 | +1 | −1 | −1 | −1 |
| 7 | +1 | +1 | −1 | −1 | −1 | −1 | −1 | +1 | −1 | −1 | +1 | +1 | +1 | −1 | +1 | −1 | +1 | +1 | −1 | −1 |
| 8 | +1 | −1 | −1 | −1 | −1 | +1 | +1 | +1 | −1 | +1 | +1 | −1 | +1 | −1 | −1 | −1 | +1 | −1 | −1 | −1 |

The transmission with variable data rate is supported by assigning a different number of time slots per service. For applications with a low data rate, one or two slots are used per frame. However, for applications with a relatively high data rate, a relatively large number of time slots per frame are assigned. The following Table 3 shows the resulting data rate with respect to the number of time slots per frame when a QPSK and 16-QAM (Quadrature Amplitude Modulation) modulation with a roll-off factor of $\alpha=0.2$ are used. As is shown by Table 3, the lowest data rate (1 time slot per frame) is approximately 145 kbit/s, whereas the maximum data rate is approximately 28 Mbit/s (all the time slots per frame).

TABLE 3

| Number of time slots | Data rate in Mbit/s | | Application |
|---|---|---|---|
| | QPSK | 16-QAM | |
| 1 | 0.145 | 0.291 | ISDN/DECT |
| 12 | 1.748 | 3.49 | 1–2 DAB |
| 36 | 5.24 | 10.49 | 2–4 Data transfer |
| 46 | 6.7 | 14.4 | 1–2 Video |
| 96 | 13.99 | 27.98 | 2–4 TV or 1HDTV |

The check signals are used, together with the technology of carrier sensing, for detecting free time slots and frequencies. Furthermore, they are used for resolving collision conflicts and for initializing a communications connection. The information contained in these signals comprises the cluster identifier number with which the active subscriber station is associated, the packet destination address, the first time slot to be used for all the further transmissions and also other instructions. Overall, there are 16 check signals available. Each active subscriber station must be capable of detecting the check signals of the adjacent cluster in order to avoid frequency collisions.

An example of a way of organizing the check signals is given below:
Cluster identity: 32 bits
Terminal identity number: 6 bits
Target address terminal identity: 6 bits
Transmission/reception/radio: 2 bits Number of first slot: 7 bits
Acknowledgement: 4 bits
Other purposes: 25 bits.

Since the information which contains the check signals is the most important, it must be well protected. For this reason, the check channel can advantageously be configured in such a way that the check signals are effectively raised by several dBs and thus have greater power efficiency than the actual data.

The solution proposed here is based on efficient channel coding. The overall 82 check information bits per time slot of each subscriber station are coded with a rate ¼ convolution code with 8 states. 3 bits are required for the trellis termination. The 340 coded bits are modulated with a QPSK modulation, which produces 170 modulated symbols. These modulated symbols are assigned to a sub-slot with a duration of 25.8 $\mu$s.

Figure 8:
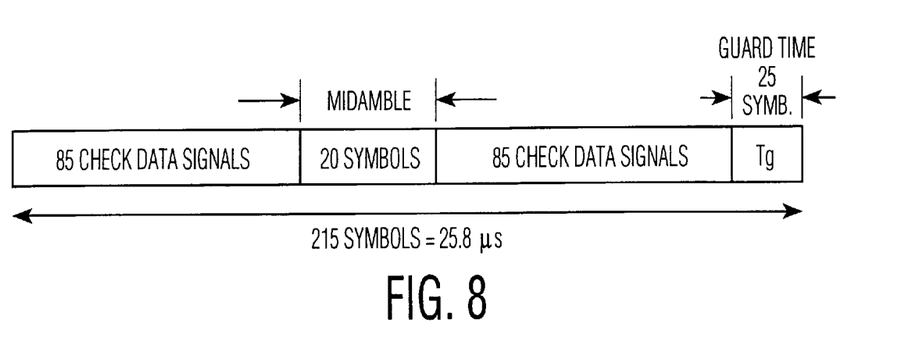
FIG. 8 shows a diagram of the organization structure in a sub-slot.

The structure of such a sub-slot is illustrated in a diagram in FIG. 8. Each sub-slot has a 2.4 $\mu$s-long midamble (20 symbols) and a guard time of 3 $\mu$s (25 symbols). It should also be noted that simultaneous transmission/reception at a subscriber station is not possible. For this reason, each subscriber station receives a sub-slot for itself. No other subscriber station can use this sub-slot, since otherwise each of the two subscriber stations cannot hear the respective other check signal.

After the channel coding, the coded data stream is modulated in the transmitter. The function of the modulator in the modulation and filter device 5 (cf. FIG. 2) consists in adopting the digital signal to the transmission medium after the channel coding. For this reason, suitable modulation has to be selected, it being necessary to take into account the transmission channel properties, the spectral effectiveness, the broadcast power and the complexity of the receiver.

The modulation method which is executed can advantageously be a QPSK modulation. For a transmission with a high data rate, for example for the transmission of digital video signals, a modulation form of a higher order, for example 16-QAM, could be necessary. The mapping of the information is based, for example, on the Gray mapping. Furthermore, the selection of these modulations depends on the coverage area. For a moderately sized coverage area (one wall with 30 m spacing or two walls with 10 m spacing), the 16-QAM modulation is used, for example.

In contrast, for relatively large coverage areas (two walls with 30 m spacing), the QPSK modulation is used. The decision regarding the selection of QPSK or 16-QAM modulation is expediently made when the connection is first established between two terminals. The 16-QAM modulation is selected first. If the transmitter receives an acknowledgement from a receiver, the 16-QAM modulation can be continued. Otherwise, the QPSK modulation is selected for further transmission.

The filters for pulse shaping in the modulation and filter device 5 of the transmitter (FIG. 2) and in the device 9 in the receiver (FIG. 3) are both cosine² filters with a roll-off factor or $\alpha$=0.2. With the proviso of 16-QAM modulation and a factor of 1.2-times bandwidth expansion owing to signal pulse shaping together with a channel coding rate and the necessary organization outlay (guard time, midamble, check signals), the following maximum data rate per building/flat in the local network is obtained:

$$R = 10 \times 10^6 \cdot \frac{188}{204} \cdot \frac{96}{100} \cdot \frac{816}{860} \cdot \frac{4}{1.2} \approx 28 \text{ Mbit/s}. \quad (1)$$

In the case of QPSK modulation, the maximum data rate per building/flat in the local network is approximately 14 mbit/s.

Access to the network is based both on carrier sensing and on the use of the transmitted check signals. Carrier-Sensing Multiple Access (CSMA) means that subscriber stations listen into the channel and use it only if a time slot is free. The consequence of this is that each transmitter (or receiver) has a receiver (or transmitter) for carrier sensing.

This can be achieved by executing a correlation with the midambles broadcast within each time slot. A seizure technique is required which operates in such a way that subscriber stations do not make the decision to transmit simultaneously. It is a precondition that each subscriber station can detect the presence of a signal within a time slot. This means that all the subscriber stations are capable of hearing one another.

Figure 9:
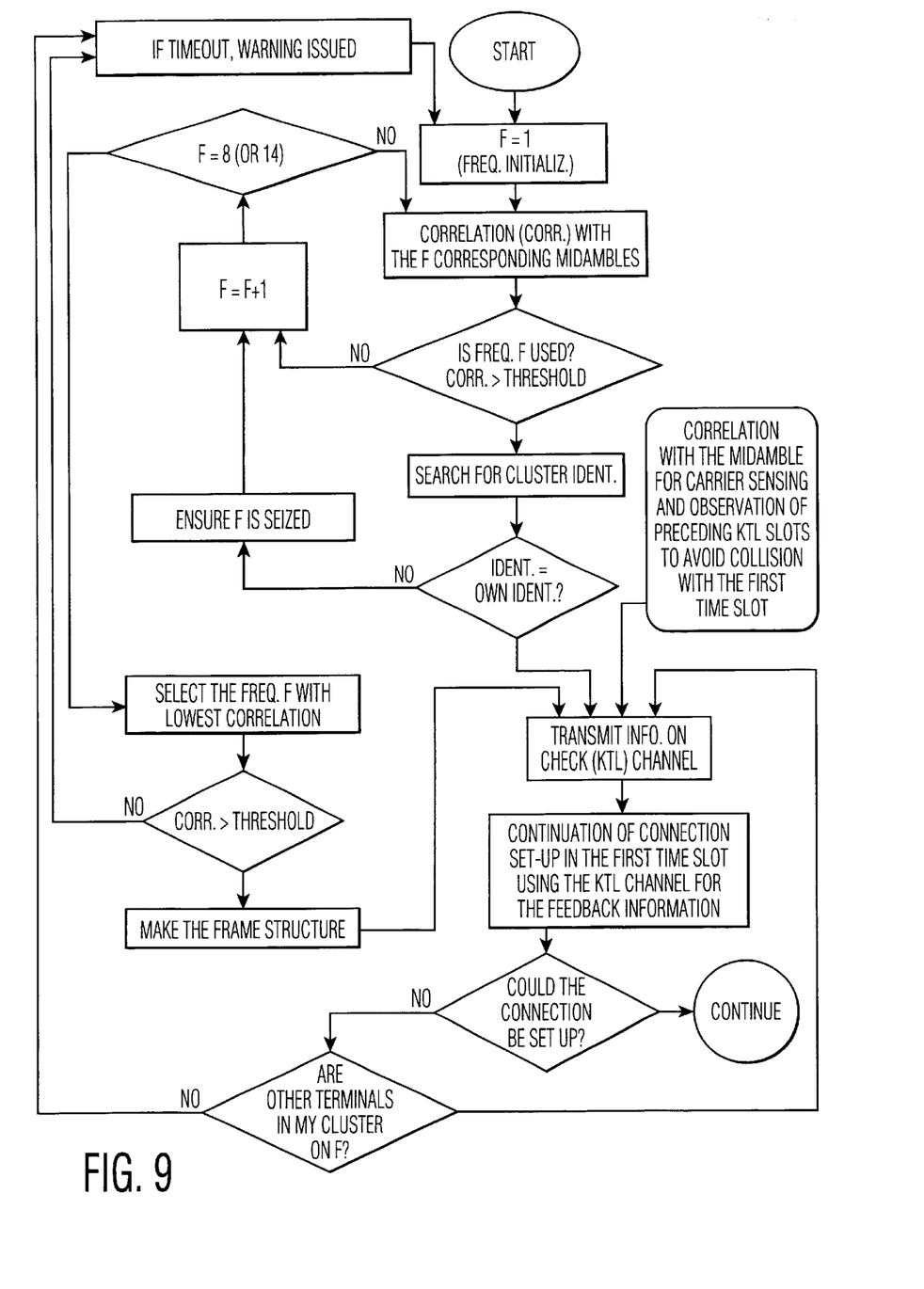
FIG. 9 shows a flowchart of an example of the strategy during the initialization of a communications connection for the transmit end.
Figure 10:
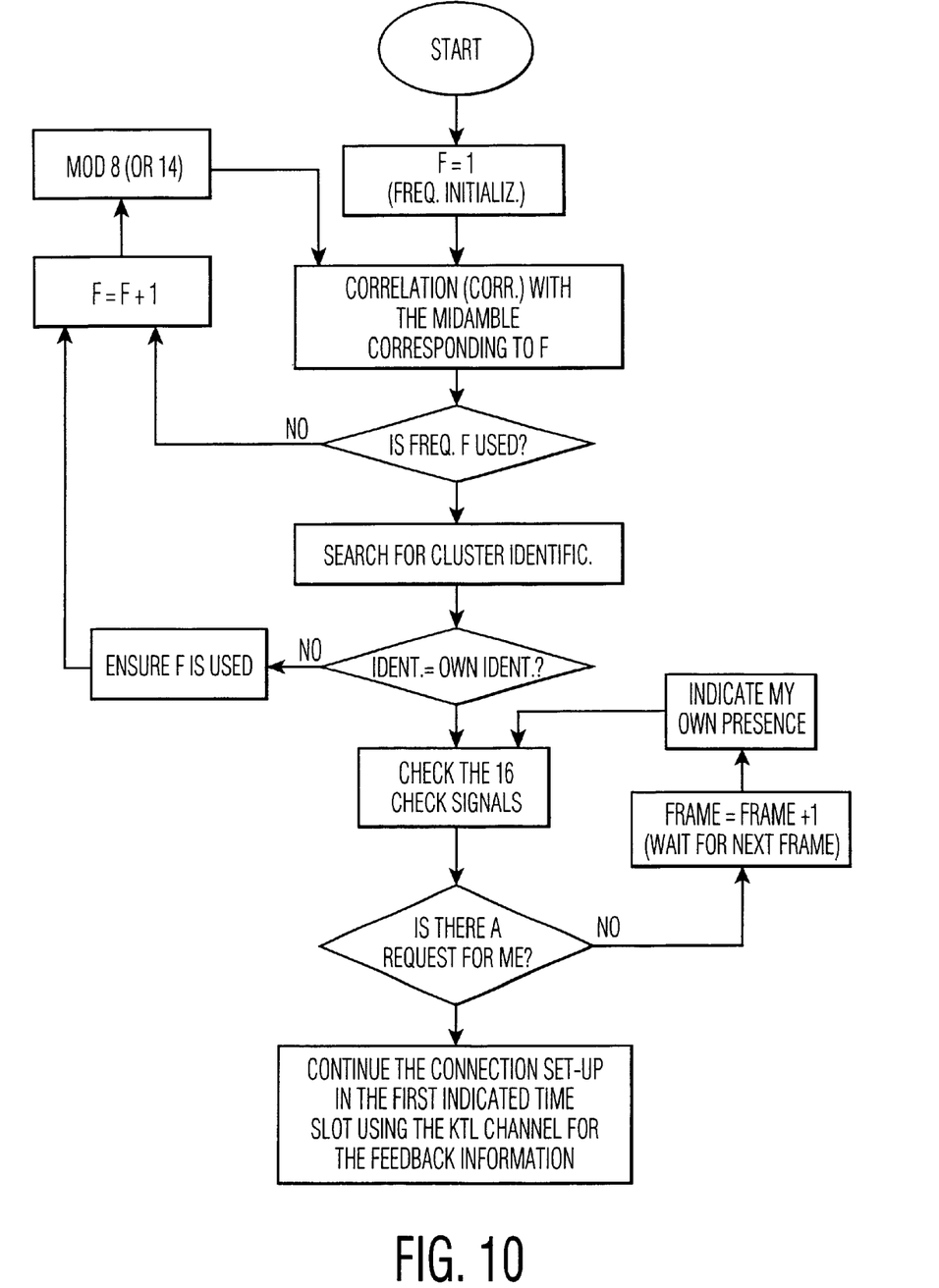
FIG. 10 shows a flowchart of an example of the strategy during the initialization of a communications connection for the receive side.

FIGS. 9 and 10 show a strategic example for the transmit end and receive end for setting up a first connection (connection set-up=initialization) between two active subscriber stations. The terminal, which would like to transmit data, firstly searches for the available network (or the presence of a frame structure), i.e. the frequency used by its own cluster (cf. FIG. 9). This can be achieved by correlation with midambles and by testing the cluster identifier number of the respective check channel.

If the network is available, the free time slots are detected again by correlating with the midambles and using the check channel information. Via the check channels, this new terminal seizes the first time slot by calling up the subscriber station with which it would like to speak and by indicating the first time slot which is used for the transmission. The accepting receiver responds on the acknowledgement channel and listens during the aforesaid time slot. If the network is absent, the subscriber station creates its own frame structure.

The terminal which would like to receive data searches for the available network also, by comparing its own cluster identifier number with all the available frame structures (cf. FIG. 10). If its own cluster identifier number is detected, it searches for a request in all the check channels by checking the terminal identifier number. If there is an enquiry (the same terminal identifier number is found), it communicates, via the check channel, its presence and the indication of its acceptance to receive. However, if there is no enquiry, it merely informs the other subscriber stations of its presence by using the check channel.

As has already been mentioned, 16 check channels are available. The seizure of the check channels is executed chronologically. The first check channel is used by the first active subscriber station in the network, the second check channel by the second active subscriber station in the network etc. In this way, up to 16 active subscriber stations can use check channels.

Subscriber stations which wish to become active when 16 subscriber stations are already active have a network access without using check channels. If two subscriber stations wish to seize the same starting time slots at the same time, priority is given to the first of the stations. This is achieved by the request for subscriber stations to modify their selection of the starting time slot if another subscriber station has already transmitted on the check channel that it would like to use this time slot.

The receiver executes, as has already been mentioned, essentially inverse operations to those of the transmitter. However, it is also necessary to cope with a large number of synchronization functions, arising from the time-slot synchronization between the transmitter and receiver, as well as individual packet synchronizations (position, symbol, carrier).

The re-establishment of the symbol timing can be executed by using the midamble symbols transmitted periodically during each time slot. By detecting the position of other packets, the time slot pattern can be determined by using a very narrow loop filter.

Frequency synchronization is required in order to determine the frequency error between the local transmitter oscillator and the local receiver oscillator. A number of pilot-supported/non-supported algorithms, for example block-based Viterbi & Viterbi (or Crozier technology) are available for this purpose. They should be precise to a few hundredths of a degree per symbol duration and have a hold-in range which permits cheap and simple oscillators to be used.

The demodulation takes place coherently using the channel state information. It has been shown that each subscriber station has a useful band of 10/1.2 MHz for transmitting data within a cluster. The symbol duration is then 120 ns. The maximum echo length of the channel is not much longer than the symbol duration. The interference effect is restricted to only two symbols. The best way of counteracting this interference effect is to carry out an equalization performed in an optimum manner, i.e. executing a Viterbi equalization with only 2–4 states.

The channel assessment can be carried out by using the midamble information. The received midamble is correlated with the known symbols, which produces the channel state information. The 16 centre symbols of the training sequence are used for forming the correlations. After the equalization, the demapping operation is executed which results in hard decisions. The selection of the demapping (QPSK or 16-QAM) is carried out in an empirical/practical manner. Firstly, the 16-QAM demapping is executed. If the error indication after the channel decoding is 1, the QPSK demapping is executed.

After the demodulation and the equalization, the contents of each packet are extracted from the received time slot. In the case of QPSK modulation, this corresponds to a Reed-Solomon noise code word. On the other hand, in the case of 16-QAM modulation this corresponds to a packet of four Reed-Solomon code words. These received words are finally subjected to a Reed-Solomon decoding. The Reed-Solomon decoding produces the best code word and corrects error bursts which have occurred. Up to 64 successive bit errors can be corrected by the Reed-Solomon decoding. If the Reed-Solomon decoding is not capable of finding a code word, it provides a signalling symbol for the presence of non-correctable errors. This error detection capability of the Reed-Solomon decoding can be used for ARQ protocols or for further procedures such as error concealment, for example.

Figure 11:
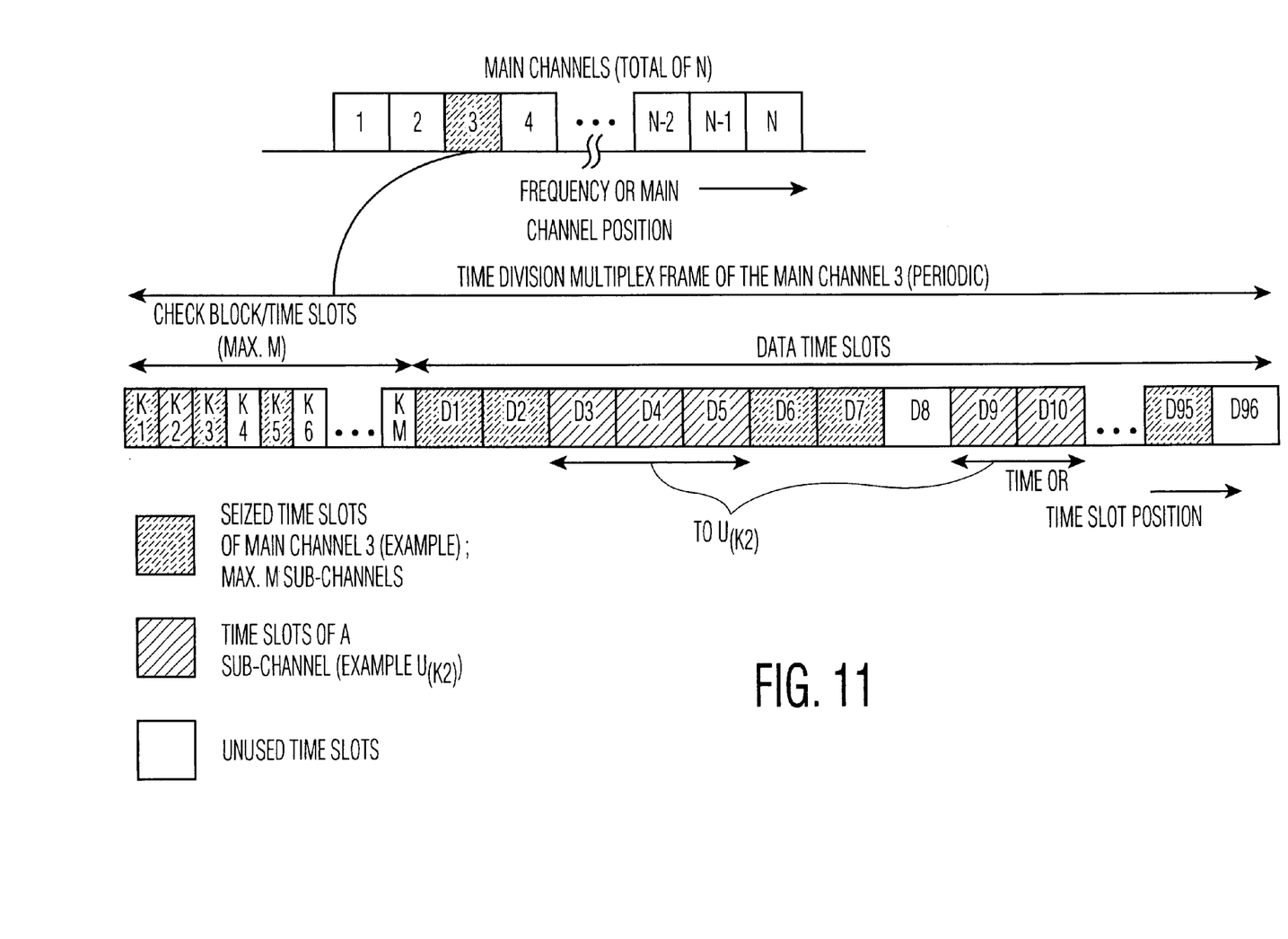
FIG. 11 shows an example of a channel scheme which contains main channels at the top and a main channel selected therefrom at the bottom with a plurality of time division multiplex (TDMA) frames each represented symbolically as boxes.

FIG. 11 illustrates another example of a channel scheme which contains N main channels at the top and a main channel selected therefrom at the bottom, with a plurality of time division multiplex (TDMA) frames. As is shown by the top illustration of FIG. 11, a relatively broad frequency band is divided up according to the FDMA method into N carrier frequency ranges, namely the so-called main channels. In the example, the main channel 3 is seized. According to the TDMA method, a plurality of time slots, namely the so-called sub-channels, which are distributed in a periodic frame structure can be formed on each carrier frequency level.

The check signals to be transmitted each use a proportion of the time slots provided per main-channel signal time-slot frame. The transmission of the check signals is performed in a check block in the TDMA time-slot frame. In the example illustrated at the bottom of FIG. 11, the check block is located at the start of the start of the TDMA time slot frame, so that the start of a time slot frame is indicated in each case by the transmission of a check block. In the example, the check block contains the check-signal time slots K1 to KM. The main channel illustrated in particular at the bottom in FIG. 11 has, as sub-channels, not only the check signal time slots K1 to KM but also a plurality of time slots D1 to D96 used for transmitting data.

What is claimed is:

1. Radio transmission method for digital multimedia data signals between a plurality of subscriber stations, each having a transmitter and a receiver, in a local network, in particular an indoor network, using a mixed frequency and time division multiplex method FDMA (Frequency Division Multiple Access)/TDMA (Time Division Multiple Access), in which a relatively broad frequency band is divided according to the FDMA method into a plurality of carrier frequency ranges, namely the so-called main channels, and a plurality of time slots, namely the so-called sub-channels, distributed in a frame structure, are formed on each carrier frequency level according to the TDMA method, characterized in that a limited number of main channels, but at least one, is assigned to a grouping, that is to say a so-called cluster, of subscriber stations, in that a main channel signal is distributed between the one or more sub-channel signals which are associated with a cluster and which are transmitted using the TDMA method, in that each transmitter of an activated subscriber station transmits a detectable check signal, in its transmissions, and in that, on the basis of detection of this check signal in the respective receiver, other, newly activated subscriber stations determine the presence of transmit signals within a specific, spatially limited range, namely their own respective transmission range, and wherein in case a main channel for the cluster to which the checking subscriber station belongs has been detected, and this main channel has enough unoccupied transport capacity for the planned transmissions of the checking subscriber station, the corresponding time slot/s of the main channel are seized from the checking subscriber station, and wherein in the case that a main channel has not been detected for the cluster to which the checking subscriber station belongs, or in the case that the detected main channel cannot provide the required transport capacity for the planned transmissions of the checking subscriber station, a new, unoccupied main channel is seized by the checking subscriber station for the cluster.

2. Radio transmission method according to claim 1, characterized in that the check signals to be transmitted each use a proportion of the time slots provided per main-channel signal time-slot frame.

3. Radio transmission method according to claim 2, characterized in that the transmission of the check signals is performed in a check block in the TDMA time-slot frame.

4. Radio transmission method according to claim 3, characterized in that the transmission of the check block is always performed at the start of the TDMA time-slot frame, so that the start of a time-slot frame is indicated in each case by the transmission of a check block.

5. Radio transmission method according to claim 3, characterized in that a specific, previously specified sequence is maintained in the arrangement of the check time slots.

6. Radio transmission method according to claim 1 characterized in that a sub-channel is composed of a check time slot and at least one time slot used for data transmission.

7. Radio transmission method according to claim 6, characterized in that the check time slots have a duration which deviates from the time slots used for data transmission.

8. Radio transmission method according to claim 1 characterized in that a training sequence which is known both at the transmit end and at the receive end is transmitted within the check signal, it being possible to use said training sequence for channel assessment and for determining the channel seizure of the respective main channel.

9. Radio transmission method according to claim 8, characterized in that the training sequence is transmitted in the center of the data sequence of the check signal.

10. Radio transmission method according to claim 1 characterized in that, in the case of a subscriber becoming inactive, the frame structure remains unchanged, despite time slots which are now empty, until one or more newly added subscribers use the free time slots.

11. Radio transmission method according to claim 1 characterized in that the check block is configured in such a way that the check signals are several dBs stronger than the actual data.

12. Radio transmission method according to claim 1 characterized in that sequences which contain their own subscriber station identifier number and the subscriber station identifier number of those subscriber stations for which the transmissions are intended are transmitted within the check signal.

13. Radio transmission method according to claim 12, characterized in that the sequences in the data sequence of the check signal relating to the identification numbers are transmitted subsequently to the sequence assigned to the respective cluster.

14. Radio transmission method according to claim 1 characterized in that a sequence which indicates the start position of the time slot which is to be seized first and is used for further connection set-up is transmitted within the check signal.

15. Radio transmission method according to claim 1 characterized in that the check signals which are to be transmitted are provided with an error protection.

16. Radio transmission method according to claim 15, characterized in that the error protection is achieved by means of a code rate ¼.

17. Radio transmission method according to claim 1, characterized in that in each case a training sequence which can be used for channel assessment and for determining the channel seizure of the respective main channel is transmitted within the time slots used for the general transmission of information or data.

18. Radio transmission method according to claim 17, characterized in that the training sequence is transmitted in each case in the center of the data sequence of a time slot.

19. Radio transmission method according to claim 1 characterized in that the receiver or receivers provided on the basis of the address indicated by a transmitter transmits one or more acknowledgements which serve to set up or maintain a connection.

20. Radio transmission method according to claim 17, characterized by an acknowledgement during the setting up of a connection.

21. Radio transmission method according to claim 1 characterized in that the seizure of a channel intended for a transmission is tested by means of a decoder device operating at the receive end in a subscriber station provided with transmitter and receiver, all the main channels being checked not only for the presence of a signal but also to determine whether a check signal and whether training sequences are being transmitted, and in the presence of check signals a distinction is made between those which are associated with the same, that is to say their own cluster, and those which originate from other clusters.

22. Radio transmission method according to claim 21, characterized in that in order to decide whether a signal is that of the same cluster or of another cluster, the cluster identifier sequence or the number determined by evaluation is compared with that of the original cluster.

23. Radio transmission method according to claim 1 characterized in that the seizure of a main channel is carried out by the transmitter of a subscriber station only on two preconditions, namely a) if the contingent of main channels permitted in the relevant, broad frequency band per cluster, that is to say at least one main channel, has not yet been exhausted for the original cluster, and b) if in accordance with the sensing possibilities of the testing transmitter and/or of the receive component, necessary for this purpose, of a subscriber station which is becoming activated the respective main channel is not seized by a signal of another cluster located in the relatively direct vicinity.

24. Radio transmission method according to claim 23 characterized in that when searching for a main channel, insofar as the contingent has not yet been exhausted, the signal strength of the channels is taken into account in the case in which a completely free channel has not been found during a first test and there is no channel with sufficiently free capacity in the same cluster, and that channel with the exception of the same cluster which has the lowest level is newly seized, which constitutes the most favorable precondition for the transmission of the same cluster and entails the lowest probability that the transmission in other clusters is disrupted.

25. Radio transmission method according to claim 23 characterized in that, when searching for a main channel, insofar as the contingent has not yet been exhausted, a defined limit value of the reception level or a field strength limit value is taken into account in the case in which the signal of the tested main channel originates from another cluster, and in that a seizure is not performed if a specific value is reached or exceeded.

26. Radio transmission method according to claim 25 characterized in that, when searching for a main channel, interference signals are also taken into account, so that, if possible, a channel which is not subject to interference or is subject to as little interference as possible, can be selected, it being possible to perceive the interference signals by the fact that they contain none of the defined check signals and therefore do not provide any result during the test of the main channel.

27. Radio transmission method according to claim 23, characterized in that, after a usable main channel has been found, the seizure of a sub-channel is carried out by the transmitter of the subscriber station which is becoming activated, in the following steps:

a) the time slot or slots to be seized are checked for the presence of a signal or of signals and a test is also carried out to determine whether the necessary number of free time slots, at least one time slot, is present;

b) if the necessary number of free time slots, that is to say at least one time slot, has been found, the intention to seize a specific time slot in the TDMA time-slot frame as initialization time slot is signaled via the check channel;

c) in the following frame, the previously signaled initialization time slot is used and the intention to seize further time slots in the frame is signaled by indicating the relevant positions in the initialization time slot;

d) the check block is evaluated by the transmitter of the subscriber station to determine whether an acknowledgement has been carried out by the receiver within a specific period, e) after the acknowledgement has been received, the transmission takes place in the indicated time slots.

28. Radio transmission method according to claim 27, characterized in that, during the seizure of the sub-channel by the transmitter of a subscriber station which is becoming activated, the time slot or slots to be seized are checked for the presence of the training sequence.

29. Radio transmission method according to claim 27, characterized in that during the seizure of the sub-channel by the transmitter of a subscriber station which is becoming activated after the required number of free time slots has been found, the intention of seizing a specific time slot in the TDMA time-slot frame as an initialization time slot is realized by inserting the identification signal provided for this purpose, in the same check channel.

30. Radio transmission method according to claim 27 characterized in that after a useful main channel has been found during the seizure of a sub-channel by the transmitter of the subscriber station which is becoming activated, it is also taken into account whether the seizure of the time slot which is intended as the initialization time slot by another subscriber station is indicated, and will take place, in the check signal element, and in that seizure of the relevant time slot by the transmitter of this subscriber station does not take place if the other subscriber station lies, in the sequence of the check signals, upstream of the transmitter of the subscriber station which is becoming activated.

31. Radio transmission method according to claim 27 characterized in that, if one or more sub-channel signals are already present during the seizure of a sub-channel, the timing of this signal or these signals is determined and is used for incorporating its own signals in a correctly timed manner.

32. Radio transmission method according to claim 31, characterized in that, if one or more sub-channel signals are already present during the seizure of the sub-channel, the timing of this signal or these signals is determined with the aid of the transmitted training sequences of this signal or these signals.

33. Radio transmission method according to claim 32, characterized in that the timing of the training sequence or training sequences is determined by correlating the received data sequences with the stored reference sequence.

34. Radio transmission method according to claim 1 characterized in that the transmission quality after the seizure of a main channel by the addressed receiver of a subscriber station which is becoming activated is tested for a certain time and the result of this testing is communicated to the relevant transmitter of this subscriber station.

35. Radio transmission method according to claim 34, characterized in that when inadequate quality is determined, a new main channel is searched for, the evaluation of the transmitted check signals within the provided transmission ranges enabling it to be concluded reliably whether a transmission is to take place.

36. Radio transmission method according to claim 1 characterized in that, for the transmission, either QPSK (Quadrature Phase Shift Keying) or optionally DQPSK (Differential QPSK) modulation or 16-QAM (Quadrature Amplitude Modulation) modulation is used selectively.

37. Radio transmission method according to claim 1 characterized in that QPSK or optionally DQPSK modulation is used for the transmission of the check signals.

38. Radio transmission method according to claim 1 characterized in that the time slots of different subsignals of a main channel signal are separated by so-called guard time intervals which do not, however, contain any information.

39. Radio transmission method according to claim 1 characterized in that the transmitters of the subscriber stations transmit in each case important auxiliary information and/or control information which is intended for receivers of oversubscriber stations of the same cluster.

40. Radio transmission method according to claim 39, characterized in that the additional signals containing this auxiliary information and/or control information is transmitted in the same time slots as the check signals.

41. Radio transmission method according to claim 39 characterized in that, in the subscriber stations, the receive component which is provided for general reception of data transmissions is designed in such a way that it can be used for testing the additional signals during the channel seizure phase.

42. Radio transmission method according to claim 1 characterized in that the identifier numbers of the clusters and the subscriber stations are allocated during a marking and initialization procedure to which all the subscriber stations of a cluster are to be subjected.

43. Radio transmission method according to claim 42, characterized in that the allocation of the identifier numbers is performed by setting by switch.

44. Radio transmission method according to claim 42, characterized in that the allocation of the identifier numbers is performed by using a uniform smart card.

45. Radio transmission method according to claim 42, characterized in that the allocation of the identifier numbers is performed by a transmission possibility by means of direct coupling.

46. Radio transmission method according to claim 42, characterized in that the allocation of the identifier numbers is performed by means of an automatic procedure during a switch-on procedure which takes place according to specific rules.

47. Radio transmission method according to claim 42 characterized in that the subscriber stations transmit, in addition to the cluster and subscriber station identifier numbers, an equipment class number which can be selected from a specific quantity of equally long numbers.

48. Radio transmission method according to claim 47, characterized in that the equipment class numbers are transmitted subsequent to the cluster and subscriber identifier numbers.

49. Radio transmission method according to claim 47, characterized in that the equipment class numbers are transmitted within the check signal element.

50. Radio transmission method according to claim 47, characterized in that the equipment class numbers are transmitted with an error protection.

51. Radio transmission method according to claim 47, characterized in that the transmission of the cluster and subscriber identifier numbers as well as of the equipment class numbers does not take place in the relevant check time slot of each time-slot frame but rather at relatively long intervals, so that the free spaces which are thus formed can be used for the transmission of other check information and control information.

52. Radio transmission method according to claim 1 characterized in that the information transmitted in the normal information element is provided with an error protection appropriate for the channel.

53. Radio transmission method according to claim 1 characterized in that the information transmitted in the normal information element is subjected to a scrambling process during transmission and to a descrambling process during the decoding to be carried out at the receive end.

54. Radio transmission method according to claim 1 characterized in that the information transmitted in the normal information element is subjected to an encryption process during transmission and is subjected to a decryption process during the decoding to be carried out at the receive end.

55. Radio transmission method for digital multimedia data signals between a plurality of subscriber stations, each having a transmitter and a receiver, in a local network, in particular an indoor network, using a mixed frequency and time division multiplex method FDMA (Frequency Division Multiple Access)/TDMA (Time Division Multiple Access), in which a relatively broad frequency band is divided according to the FDMA method into a plurality of carrier frequency ranges, namely the so-called main channels, and a plurality of time slots, namely the so-called sub-channels, distributed in a frame structure, are formed on each carrier frequency level according to the TDMA method, characterized in that a limited number of main channels, but at least one, is assigned to a grouping, that is to say a so-called cluster, of subscriber stations, in that a main channel signal is distributed between the one or more sub-channel signals which are associated with a cluster and which are transmitted using the TDMA method, in that each transmitter of an activated subscriber station transmits a detectable check signal, in its transmissions, and in that, on the basis of detection of this check signal in the respective receiver, other, newly activated subscriber stations determine the presence of transmit signals within a specific, spatially limited range, namely their own respective transmission range, and wherein in case a main channel for the cluster to which the checking subscriber station belongs has been detected, and this main channel has enough unoccupied transport capacity for the planned transmissions of the checking subscriber station, the corresponding time slot/s of the main channel are seized from the checking subscriber station, and wherein in the case that a main channel has not been detected for the cluster to which the checking subscriber station belongs, or in the case that the detected main channel cannot provide the required transport capacity for the planned transmissions of the checking subscriber station, a new, unoccupied main channel is seized by the checking subscriber station for the cluster and wherein the identifier numbers of the clusters and the subscriber stations are allocated during a marking and initialization procedure to which all the subscriber stations of a cluster are to be subjected, the subscriber stations transmit, in addition to the cluster and subscriber station identifier numbers, an equipment class number which can be selected from a specific quantity of equally long numbers and the equipment class numbers serve to distinguish between the group including at least television sets, video recorders, computers and cordless telephones, the same number also being used for other clusters, so that they cannot be used to distinguish between different clusters.

56. Radio transmission method for digital multimedia data signals between a plurality of subscriber stations, each having a transmitter and a receiver, in a local network, in particular an indoor network, using a mixed frequency and time division multiplex method FDMA (Frequency Division Multiple Access)/TDMA (Time Division Multiple Access), in which a relatively broad frequency band is divided according to the FDMA method into a plurality of carrier frequency ranges, namely the so-called main channels, and a plurality of time slots, namely the so-called sub-channels, distributed in a frame structure, are formed on each carrier frequency level according to the TDMA method, characterized in that a limited number of main channels, but at least one, is assigned to a grouping, that is to say a so-called cluster, of subscriber stations, in that a main channel signal is distributed between the one or more sub-channel signals which are associated with a cluster and which are transmitted using the TDMA method, in that each transmitter of an activated subscriber station transmits a detectable check signal, in its transmissions, and in that, on the basis of detection of this check signal in the respective receiver, other, newly activated subscriber stations determine the presence of transmit signals within a specific, spatially limited range, namely their own respective transmission range, and wherein in case a main channel for the cluster to which the checking subscriber station belongs has been detected, and this main channel has enough unoccupied transport capacity for the planned transmissions of the checking subscriber station, the corresponding time slot/s of the main channel are seized from the checking subscriber station, and wherein in the case that a main channel has not been detected for the cluster to which the checking subscriber station belongs, or in the case that the detected main channel cannot provide the required transport capacity for the planned transmissions of the checking subscriber station, a new, unoccupied main channel is seized by the checking subscriber station for the cluster and wherein a sequence which is known both at the transmit end and at the receive end is being transmitted within the check signal, said sequence being assigned unambiguously to the respective cluster and it being thus possible to use it to identify said cluster.

57. Radio transmission method according to claim 56, characterized in that the sequence which is assigned to the respective cluster is transmitted at the start of the data sequence of the check signal.

58. Subscriber station for a local radio transmission network, using a mixed frequency and time division multiplex method FDMA/TDMA, having main and sub-channels, including a front end for receiving radio transmission signals with corresponding filter and synchronizing unit, a channel decoder and a source signal decoder as well as a control unit, characterized in that an evaluation unit for received control signals is further included which detects on the basis of said received control signals whether a data transfer belongs to a cluster being assigned to the subscriber station, wherein to a cluster a limited number of main channels, but at least one, is assigned and a main channel corresponds to a specific carrier frequency range, wherein the seizure of a main channel is carried out by the transmitter of a subscriber station only on two preconditions, namely
   a) if the contingent of main channels permitted in the relevant, broad frequency band per cluster, that is to say at least one main channel, has not yet been exhausted for the original cluster, and
   b) if the respective main channel is not seized by a signal of another cluster located in the relatively direct vicinity.

59. Subscriber station according to claim 58, wherein said evaluation unit for said received control signals also detects on the basis of said control signals, to which subscriber station the data transfer is addressed and from which subscriber station the data transfer was started.

60. Subscriber station according to claim 58, wherein said evaluation unit for received control signals also detects on the basis of said control signals, which start position of the time slots to be used for the connection to be founded shall be used.

61. Subscriber station according to claim 59, wherein said evaluation unit (13) for received control signals also performs on the basis of within the control signals transferred training sequences a channel assessment and a channel seizure.

62. Subscriber station according to claim 58, further including a signal source, a channel coder, a multiplexer consisting of a time slot selector and a packet formatter, as well as a filter unit and a corresponding front end for transmitting transmission signals via an antenna.

63. Subscriber station according to claim 58, wherein after a usable main channel has been found, the seizure of a sub-channel is carried out by the transmitter of the subscriber station which is becoming activated, in the following steps:

a) the time slot or slots to be seized are checked for the presence of a signal or of signals and a test is also carried out to determine whether the necessary number of free time slots, at least one time slot, is present;

b) if the necessary number of free time slots, that is to say at least one time slot, has been found, the intention to seize a specific time slot in the TDMA time-slot frame as initialization time slot is signaled via the check channel;

c) in the following frame, the previously signaled initialization time slot is used and the intention to seize further time slots in the frame is signaled by indicating the relevant positions in the initialization time slot;

d) the check block is evaluated by the transmitter of the subscriber station to determine whether an acknowledgement has been carried out by the receiver within a specific period, e) after the acknowledgement has been received, the transmission takes place in the indicated time slots.

64. Subscriber station according to claim 58, wherein after a useful main channel has been found during the seizure of a sub-channel by the transmitter of the subscriber station which is becoming activated, it is also taken into account whether the seizure of the time slot which is intended as the initialization time slot by another subscriber station is indicated, and will take place, in the check signal element, and in that seizure of the relevant time slot by the transmitter of this subscriber station does not take place if the other subscriber station lies, in the sequence of the check signals, upstream of the transmitter of the subscriber station which is becoming activated.

65. Subscriber station according to claim 58, wherein to a subscriber station, in addition to the cluster and subscriber station identifier numbers, an equipment class number which can be selected from a specific quantity of equally long numbers, for example comprising 4 binary places is assigned.

66. Subscriber station according to claim 65, wherein said equipment class numbers serve to distinguish between at least any of television sets, video recorders, computers and cordless telephones, the same numbers also being used for other clusters, so that they cannot be used to distinguish between different clusters.

* * * * *

UNITED STATES PATENT AND TRADEMARK OFFICE
CERTIFICATE OF CORRECTION

PATENT NO. : 6,275,506 B1
DATED : August 14, 2001
INVENTOR(S) : Khaled Fazel et al.

It is certified that error appears in the above-identified patent and that said Letters Patent is hereby corrected as shown below:

<u>Title page,</u>
Item [73], should read as follows:
-- [73] Thomson Licensing S.A. and Deutsche Forschungsanstalter Fur Luft-Und Ramfahrt E.V. --

Signed and Sealed this

Sixth Day of May, 2003

JAMES E. ROGAN
*Director of the United States Patent and Trademark Office*